United States Patent [19]

Grosskinsky et al.

[11] 4,404,176
[45] Sep. 13, 1983

[54] PREPARATION OF HYDROXYLAMMONIUM SALTS

[75] Inventors: Otto-Alfred Grosskinsky; Elmar Frommer, both of Ludwigshafen, Fed. Rep. of Germany; Günther Rapp, deceased, late of Ludwigshafen, Fed. Rep. of Germany, by Ruth E. Rapp, legal representative; Erwin Thomas, Freinsheim, Fed. Rep. of Germany

[73] Assignee: BASF Aktiengesellschaft, Fed. Rep. of Germany

[21] Appl. No.: 344,615

[22] Filed: Feb. 1, 1982

[30] Foreign Application Priority Data

Mar. 5, 1981 [DE] Fed. Rep. of Germany ....... 3108257

[51] Int. Cl.³ .............................................. C01B 21/14
[52] U.S. Cl. ..................................... 423/387; 423/388
[58] Field of Search ................................ 423/387, 388

[56] References Cited

U.S. PATENT DOCUMENTS 3,954,946 5/1976 Graf et al. ........................... 423/387

FOREIGN PATENT DOCUMENTS

| 8479 | 1/1981 | European Pat. Off. . |
| 956038 | 2/1958 | Fed. Rep. of Germany . |
| 920963 | 11/1961 | Fed. Rep. of Germany . |
| 945752 | 10/1962 | Fed. Rep. of Germany . |
| 1088037 | 11/1964 | Fed. Rep. of Germany . |

*Primary Examiner*—O. R. Vertiz
*Assistant Examiner*—Wayne A. Langel
*Attorney, Agent, or Firm*—Keil & Witherspoon

[57] ABSTRACT

A process for the preparation of hydroxylammonium salts by catalytic reduction of nitric oxide with hydrogen in a dilute aqueous solution of a mineral acid, in the presence of a suspended supported platinum catalyst, at elevated temperatures, wherein the reaction is carried out in a conventional manner, in one or more reaction zones, under superatmospheric pressure, and the exit gases produced are let down to a lower pressure, and are reacted, in a downstream reaction zone, with the reaction mixture, containing hydroxylammonium salt, the ammonium salt, the supported platinum catalyst and residual mineral acid, from the upstream reaction zone or zones, or with a fresh aqueous solution of the mineral acid, which contains the supported platinum catalyst in suspension.

3 Claims, No Drawings

PREPARATION OF HYDROXYLAMMONIUM SALTS

The present invention relates to a process for the preparation of hydroxylammonium salts by catalytic reduction of nitric oxide with hydrogen in a dilute aqueous solution of a mineral acid, in the presence of a suspended supported platinum catalyst, at elevated temperatures, in one or more reaction zones.

In the preparation of hydroxylammonium salts by catalytic hydrogenation of nitric oxide with hydrogen, nitrous oxide is formed as one of the by-products, and the resulting exit gas is a mixture containing hydrogen, nitric oxide and nitrous oxide. Depending on their composition and on the pressure, gas mixtures of this type may be explosive. This applies in particular if it is desired to make substantial use of the exit gases from the hydroxylamine synthesis, which still contain nitric oxide and hydrogen. European Patent Application No. 0,008,479 discloses diluting the starting gas with from 10 to 80% by volume of an inert gas in the preparation of hydroxylammonium salts by catalytic reduction of nitric oxide with hydrogen. Although, in a procedure of this type, an explosive exit gas is not produced, the high degree of dilution means that the useful materials contained in the exit gas cannot be reused without expensive technical measures. Furthermore, the above European patent application mentions that the reaction is carried out in two separate reactors under slightly superatmospheric pressure. Very pure starting gases are required, and the use of such gases industrially is very expensive. In addition, no indication is given as to how the exit gases produced can be reused safely.

It is an object of the present invention to prepare hydroxylammonium salts by catalytic reduction of nitric oxide with hydrogen under superatmospheric pressure, and to reuse safely the exit gases formed.

We have found that this object is achieved by a process for the preparation of hydroxylammonium salts by catalytic reduction of nitric oxide with hydrogen in a dilute aqueous solution of a mineral acid, in the presence of a suspended supported platinum catalyst, at elevated temperatures, wherein the reaction is carried out in a conventional manner, in one or more reaction zones, under superatmospheric pressure, and the exit gases produced are let down to a lower pressure, and are reacted, in a downstream reaction zone, with the reaction mixture, containing the hydroxylammonium salt, the ammonium salt, the supported platinum catalyst and residual mineral acid, from the upstream reaction zone or zones, or with a fresh aqueous solution of a mineral acid, which contains the supported platinum catalyst in suspension.

The novel process has the advantages that the hydroxylamine synthesis is carried out under relatively high pressure, thus giving good space-time yields, the gases produced are usefully employed for the hydroxylamine synthesis, and at the same time the formation of explosive mixtures when the exit gases are reused is avoided.

As a rule, the molar ratio of hydrogen to nitric oxide is from 1.5:1 to 6:1, and particularly good results are obtained when a molar ratio of from 3.5:1 to 5:1 is maintained in the exit gas. It is not necessary to use pure starting gases, and the hydrogen and nitric oxide can contain, for example, up to 10% by volume of an inert gas, such as nitrogen.

It is advantageous to use a strong mineral acid, eg. hydrochloric acid, nitric acid, sulfuric acid or phosphoric acid, as the acid. The acidic salts thereof, eg. ammonium bisulfate, are also suitable. Sulfuric acid and/or ammonium bisulfate are particularly preferred. As a rule, a 4-6 N aqueous acid is used initially, and the acid concentration is not permitted to fall below 0.2 N during the reaction.

The reaction is carried out in the presence of a supported platinum catalyst. Platinum on a charcoal carrier, especially on graphite, has proved particularly suitable. A supported catalyst of this type preferably contains from 0.2 to 5% by weight of platinum, and advantageously contains, in addition, one or more elements of main groups V and/or VI of the Periodic Table, with an atomic weight of $>31$, as well as lead and/or mercury as poisons. Suitable catalysts and their preparation are described, for example, in German Pat. Nos. 920,963, 956,038, 945,752 and 1,088,037. During the reaction, the supported catalyst is present as a suspension in the reaction solution.

The reaction is preferably carried out at from 30° to 80° C., in particular from 40° to 60° C.

The reaction is carried out in a conventional manner, in one or more reaction zones, under superatmospheric pressure. Advantageously, up to 10, in particular from 3 to 10, reaction zones are used, for example stirred kettles arranged in series as a cascade. The catalyst-containing aqueous solution of mineral acid flows through the reaction zones successively, and increasing amounts of hydroxylammonium salt are formed. To keep the content of nitrous oxide in the exit gas very low, it is advantageous to charge each reaction zone separately with fresh hydrogen and nitric oxide. The reaction is carried out under superatmospheric pressure, advantageously under from 1.5 to 30 bar, in particular from 3 to 20 bar. The pressure conditions are advantageously chosen so that the resulting exit gas, which essentially consists of nitric oxide, nitrous oxide, hydrogen, nitrogen and other inert gases, is not explosive. The exit gases produced in the individual reaction zones are collected and are let down to a lower pressure, for example from 3 to 10 bar lower, in particular atmospheric pressure. The collected exit gas is then reacted, in a downstream reaction zone, with the reaction mixture which contains hydroxylammonium salts, ammonium salts, the supported platinum catalyst and residual mineral acid, and which is produced in the upstream reaction zones. In an alternative procedure, the collected exit gases are reacted with a fresh aqueous solution of a mineral acid in the presence of a supported platinum catalyst. It is advantageous to aid fresh nitric oxide to the exit gas before it enters the last-mentioned reaction zone, in order to maintain the above ratios of nitric oxide to hydrogen. When a fresh aqueous solution of mineral acid is used, the reaction mixture produced in the last-mentioned zone is fed to the first reaction zone, which is operated under superatmospheric pressure.

Hydroxylammonium salts which are obtained by the process of the invention are suitable for the preparation of oximes, in particular cyclohexanone oxime, which is a starting material for the preparation of caprolactam.

The Example which follows illustrates the process of the invention.

EXAMPLE (a) 5 l of 4.3 N sulfuric acid and 500 g of a platinum/graphite catalyst containing 0.5% by weight of platinum are initially introduced into each of 5 stirred kettles in a cascade. 56.3 l per hour of 4.3 N sulfuric acid, as well as the catalyst, are fed into the first stirred kettle, and 2 m$^3$ (S.T.P.) per hour of hydrogen and 1.2 m$^3$ (S.T.P.) per hour of 96% strength nitric oxide are passed into each stirred kettle, from below. The reaction is carried out at 40° C. and under a pressure of 20 bar. The reaction mixture is removed from the fifth stirred kettle at the rate at which sulfuric acid is added to the first. The catalyst is separated off and recycled to the first stirred kettle. Unreacted gases, which escape via a pressure-relief valve, are measured and analyzed. 17,925 g of hydroxylammonium sulfate and an exit gas consisting of 2,084 l of hydrogen, 344 l of nitric oxide, 202 l of nitrous oxide and 240 l of nitrogen are obtained per hour. The composition of the exit gas is thus just outside the explosion limit at 20 bar. 13.5 l of hydrogen and 80.0 l of nitric oxide, taken as 100% pure, are consumed in producing 100 g of hydroxylamine.

(b) The exit gas from (a) is let down to atmospheric pressure, and is passed into a stirred vessel, of 40 l capacity, which is charged with 30 l of 4.3 N sulfuric acid and 3,000 g of platinum/graphite catalyst of the above composition, and the reaction is carried out at 40° C. under atmospheric pressure. 1,650 l of hydrogen, 60 l of nitric oxide, 204 l of nitrous oxide and 240 l of nitrogen are produced per hour. A total of 131.3 l of hydrogen and 75.9 l of nitric oxide is thus consumed in producing 100 g of hydroxylamine in (a) and (b) together.

(c) The procedure described in (b) is followed, except that a further 290 l per hour of nitric oxide are added to the exit gas obtained from (a). 1,217 l of hydrogen, 66 l of nitric oxide, 206 l of nitrous oxide and 240 l of nitrogen are produced, per hour, as an exit gas. 124.9 l of hydrogen and 75.7 l of nitric oxide are consumed in producing 100 g of hydroxylamine in (a) and (c) together.

The exit gases produced in (b) and (c) are not explosive under atmospheric pressure.

It is claimed:

1. A process for the preparation of hydroxylammonium salts which comprises: catalytically reducing nitric oxide with hydrogen in a dilute aqueous solution of a mineral acid, in the presence of a suspended supported platinum catalyst, at elevated temperatures, wherein the reaction is carried out, in one or more reaction zones, under superatmospheric pressure and wherein the exit gases produced are let down to a lower pressure, and are reacted, in a downstream reaction zone, with the reaction mixture, containing the hydroxylammonium salt, the ammonium salt, the supported platinum catalyst and residual mineral acid, from the upstream reaction zone or zones, or with a fresh aqueous solution of the mineral acid, which contains the supported platinum catalyst in suspension.

2. The process of claim 1, wherein the reaction is carried out under a pressure of from 3 to 20 bar, and the pressure of the exit gases produced is let down by from 3 to 10 bar.

3. The process of claim 2, wherein the reaction is carried out at a temperature of from 30° to 80° C.

* * * * *